(12) United States Patent
Nickel

(10) Patent No.: US 6,962,748 B2
(45) Date of Patent: Nov. 8, 2005

(54) MASKING TAPE AND ITS USE

(75) Inventor: Oliver Nickel, Hamburg (DE)

(73) Assignee: Tesa AG, Hamburg (DE)

( * ) Notice: Subject to any disclaimer, the term of this patent is extended or adjusted under 35 U.S.C. 154(b) by 112 days.

(21) Appl. No.: 09/844,083

(22) Filed: Apr. 27, 2001

(65) Prior Publication Data

US 2002/0114946 A1 Aug. 22, 2002

(30) Foreign Application Priority Data

Apr. 29, 2000 (DE) .......................................... 100 21 243

(51) Int. Cl.⁷ ......................... B32B 15/04; B32B 33/00; B32B 3/04; B32B 23/02
(52) U.S. Cl. ..................... 428/343; 428/40.1; 428/41.7; 428/41.8; 428/42.3; 428/126; 428/194; 428/354; 428/906
(58) Field of Search ................................ 428/343, 354, 428/40.1, 126, 194, 916, 41.7, 41.8, 42.3

(56) References Cited

U.S. PATENT DOCUMENTS

| | | | |
|---|---|---|---|
| 4,313,970 A | * 2/1982 | Jones et al. ................. | 427/56.1 |
| 5,356,503 A | * 10/1994 | Caryford et al. .......... | 156/272.2 |
| 5,385,783 A | * 1/1995 | Patel et al. .................. | 428/353 |
| 5,472,559 A | * 12/1995 | Cayford et al. ............. | 156/554 |
| 5,683,806 A | * 11/1997 | Sakumoto et al. ........... | 428/343 |
| 5,935,669 A | 8/1999 | Leeuwenburgh ........... | 428/20.1 |

FOREIGN PATENT DOCUMENTS

| | | | |
|---|---|---|---|
| DE | 29617896 U1 | * 12/1996 | ............. B32B/7/12 |
| DE | 296 17 896 U1 | 1/1997 | |
| DE | 296 19 424 U1 | 11/1997 | |
| EP | 0 999 251 A2 | 5/2000 | |
| WO | WO 00/15727 | 3/2000 | |

OTHER PUBLICATIONS

Derwent abstract of DE 29617896 (see above for inventor and date).*
Co-pending U.S. Appl. No. 09/844,084.
U.S. Appl. No. 09/431,849.

* cited by examiner

*Primary Examiner*—Terrel Morris
*Assistant Examiner*—Victor S. Chang
(74) *Attorney, Agent, or Firm*—Norris McLaughlin & Marcus, P.A.

(57) ABSTRACT

A masking tape comprising:
a) a heat resistant adhesive tape comprising a flexible sheet backing and a pressure sensitive adhesive composition,
b) a masking material, which is laminated in an edge region of the pressure-sensitive adhesive composition, said masking material being capable of adhering to paint and absorbing paint,
c) a masking sheet, which is laminated onto the very same edge region of the pressure-sensitive adhesive composition,
d) the masking sheet covering the masking material on a side thereof.

20 Claims, 1 Drawing Sheet

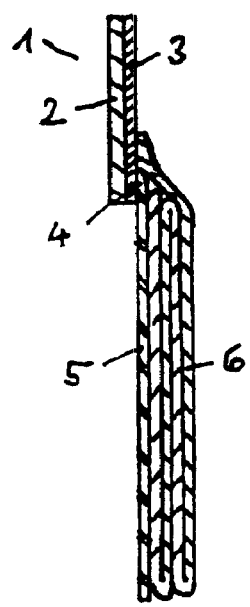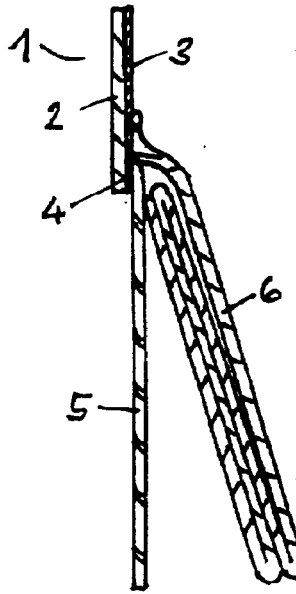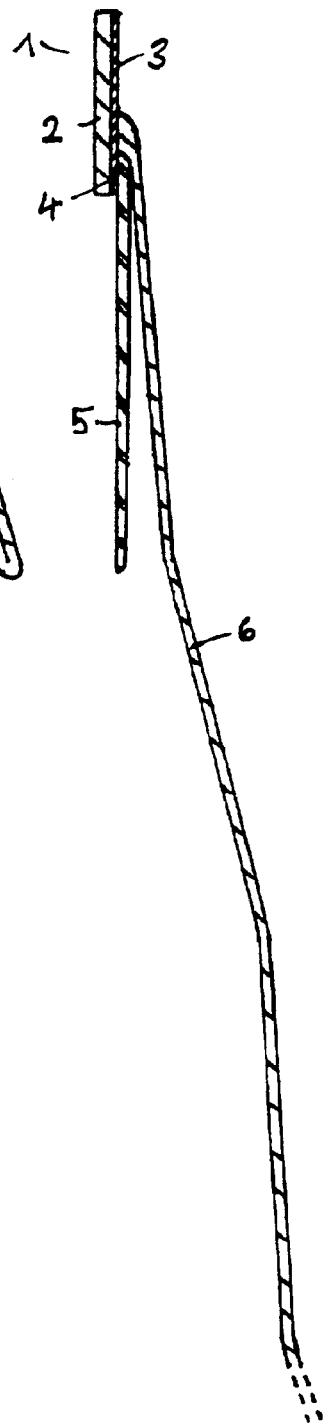

MASKING TAPE AND ITS USE

The invention relates to a masking tape, especially for covering certain parts when painting cars, as well as to the use of this tape. In particular, masking is provided for medium to large surfaces, which must not come into contact with paint in touch-up work in automobile paint shops.

Such masking tapes or shrouds are known and their use is widespread. Standard materials are, for example, 50 g weight special papers or newsprint, and also folded plastic hoods (approximately 30 µm thick or 30 g/m$^2$) or "endless" sheets from a large roll (2 m wide) as well as "2 in 1" systems as folded polyethylene sheets with adhesive tape, including also polyethylene-coated papers with adhesive tape.

Such masking systems must fulfill especially the following requirements:

Paint adhesion—After oven drying, the paint must not fall from the masking material onto the fresh paint.

Waste—A small volume of waste is important, since it determines the price of disposal.

Number of persons—Normally, an automobile is painted by only one person. It should therefore be easy for one person to apply the masking.

Number of steps—Few steps, which can be carried out quickly, are required.

Material consumption—An adhesive tape, capable of withstanding the temperatures encountered, is required for applying the masking. The consumption of masking material and adhesive tape should be small.

The previously known masking tapes and the like fulfill these requirements only to a limited extent.

|  | Advantages | Disadvantages |
| --- | --- | --- |
| Papers | Optimum paint adhesion even when paint is applied heavily in the edge region<br>Low costs | Paint bleeds through especially when applied more heavily in the edge region<br>Masking must be equipped subsequently with adhesive tape<br>Not dispensed directly on the vehicle. Therefore too much material is consumed at times, since sometimes too much or too little paper is dispensed. |
| Shrouds | No paint bleeds through<br>The whole of the vehicle is covered<br>The plastic shroud can easily be incised, in order to expose the area to be painted | Paint adhesion not optimum<br>Relatively expensive<br>High material consumption, since the whole automobile must always be covered<br>Hoods generally are steeped in paint. As a result, the automobiles cannot be marshaled in the covered state. |
| Endless sheets | See shrouds | See shrouds (exception: material consumption, since automobiles can also be covered partially) |
| 2 in 1 - Systems folded sheets with masking tape | Paint does not bleed through sheet<br>No paint bleed-through and adequate adhesion in the case of polyethylene-coated paper<br>Dispensed at vehicle<br>Convenient<br>Slight | Optimum result only when both products are used (that is, paper in the edge region and sheet for larger surface).<br>Both products are always furnished with adhesive tape. |
| Polyethylene-coated paper with masking tape | Little waste since polyethylene film is only 10 µm thick | Due to the coating (composite) and the bleaching (white), paper is not environmentally friendly and is expensive. |

It was an object of the invention to provide a remedy here and, in particular, to create a masking tape, for which an inexpensive, absorptive or adhesive material can be used, which has, in particular, good adhesion for paint, etc. (paint adhesion).

The masking tape comprises:
a) a heat resistant adhesive tape with a flexible backing and a pressure-sensitive adhesive composition.
b) a masking material, which is laminated in the edge region of the pressure-sensitive adhesive composition, has good adhesion to paint and a good absorptive capacity, as well as
c) a masking sheet, which is laminated onto the very same edge region of the pressure-sensitive adhesive composition.
d) the masking sheet completely covering the masking paper at the side, where the pressure-sensitive adhesive composition of the adhesive tape is, and, with that, backing the masking paper in the glued-on state.

Another embodiment comprises the adhesive tape as a heat-resistant adhesive tape for the automobile painter, a so-called fine line tape, with a heat resistance especially at temperatures up to 130° C. (1 hour), especially one with a sheet backing of polypropylene or particularly of soft PVC.

The adhesive tape is contemplated to be 15 to 75 mm wide and, in particular 19 to 33 mm wide.

The masking material consists of paper, woven fabric, nonwoven fabric or a sheet capable of adhering.

It is further contemplated that the masking material is unbleached Kraft paper, having a weight of 30 to 40 g/m$^2$ and a width especially of 15 to 50 cm and particularly of 20 to 40 cm.

The masking sheet has a thickness of 7 to 40 µm and especially of 8 to 20 µm, consists especially of polyolefin, particularly polyethylene and especially is corona pretreated, and the width, in particular, is 0.5 to 2 m.

In another embodiment, the masking sheet is folded so that it can be extended, follows, in particular, the external dimensions of the masking material and is folded against this is accordion fashion.

In another embodiment, the edge region of the pressure-sensitive adhesive composition, to which the masking material adheres, is 1 to 5 and particularly 2 to 4 mm wide and the thereon adjoining edge region of the pressure-sensitive adhesive composition, to which the masking sheet adheres, is 1 to 5 and, in particular, 2 to 4 mm wide.

In another embodiment, the masking tape is rolled up into a roll, the masking sheet being folded and the height of the roll corresponding approximately to the width of the masking material plus the width of the adhesive tape.

The invention also contemplates the use of the masking tape for masking parts, which are not to be painted, especially when painting automobiles.

With that, the invention combines the very good properties of absorptive or adhesive material with respect to the adhesion of paint and the very good properties of sheets in relation to reliability against bleed-through in a convenient product.

With that, the product consists of three products in one and therefore can be referred to as a "3 in 1" product. The components are an absorptive or adhesive material, an adhesive tape with a flexible sheet backing and a sheet. The following are preferred:

for example, paper: as absorptive material, unbleached Kraft paper with a weight of 30 to 40 g/m$^2$, 20 to 40 cm wide.
sheet: 10 µm (=10 g/m$^2$ of pretreated (corona) polyethylene sheet (surface tension approximately 38 dynes), width of the sheet between 500 mm and 2000 mm depending on the application, variable length usually between 10 and 30 m.

adhesive tape: with flexible sheet backing, especially of polypropylene and particularly of PVC, soft PVC being preferred, approximately 80 to 150 μm thick and a resistance to heat at 80° C. to 150° C., such as tesa 41^74, 4244, 4244 N2, 4215 and 7133, on the market from Beiersdorf AG.

The absorptive material, especially woven material, nonwoven material or paper, is intended to absorb the heavier application of paint in the edge region of the painting and to adhere reliably also after oven drying, so that paint cannot fall onto the still soft, freshly painted surface. The sheet is prepared by the corona treatment preferably so that a paint mist is fixed reliably. Furthermore, the sheet, for example, prevents paint bleeding through the paper onto the freshly painted surface.

In particular, the following product advantages result:

Optimum paint adhesion a) in the critical edge region, for example, the absorptive paper and b) on the remaining masked surface by the specially pretreated sheet.

Optimum protection against paint bleed-through by the film.

Appreciably less waste from the thin sheet (approximately a fifth of that from 50 g weight paper).

Handling by only one person, due to the convenient format and the pre-manufactured product.

Optimum material consumption a) in relation to the masking material due to the direct dispensing at the vehicle and b) with respect to the adhesive tape because of the standardized width, such as 25 mm.

Time saved by few working steps (3 in 1).

The following are the product advantages over the "2 in 1" system:

For the edge region, particularly inexpensive, untreated standard Kraft paper can be used, with which the painter is familiar.

The edge region and the large surface are covered in one step.

Adhesive tape is required only once.

In the following, the invention is described by means of an example without, however, being limited unnecessarily. In the drawing, FIG. 1 shows a diagrammatic side view of an inventive masking tape with a folded masking sheet, FIG. 2 shows a view, similar to that of FIG. 1, however with a partially unfolded masking sheet and FIG. 3 shows a view, like that in FIG. 1, the masking sheet being fully unfolded now.

In detail, the FIGS. 1 to 3 show an adhesive tape 1 with a sheet backing 2 of soft PVC, which is 100 μm thick and is resistant to temperatures up to 150° C., and a pressure-sensitive adhesive composition 3. In particular, a heat-resistant, so-called masking tape, which withstands oven drying up to 130° C. (1 hour), such as that commercially obtainable as tesa 4309 from Beiersdorf AG, Germany, and having a width of 25 mm, a thickness of 170 μm and an adhesion to steel of 8.75 N/25 mm, is suitable. On the one edge region 4 of this adhesive tape 1, unbleached Kraft paper as masking paper 5, 30 cm wide, with a weight of 35 g/m², is glued in a width of 3 mm. Next to this masking paper 5, a masking sheet 6, namely a 10 μm thick corona-treated polyethylene film, 1 m wide and folded, is glued onto the next part of this edge region 4 in a width of 3 mm.

The folding of the masking sheet 6 is known and is undertaken particularly in the manner known and familiar to the user, the whole of the masking tape being rolled up into a roll for easier handling. Preferably, the folding is carried out so that the folds of the masking sheet 6 lie on top of one another in the direction of the masking material 5 and are held by the latter in the folded state. This has the advantage, for example, that an automobile, equipped with an inventive masking tape and prepared for painting, can still be moved and entered, while the masking tape is installed but not yet unfolded. Only when the automobile is at its appointed place at the appointed time, is the masking tape unfolded by slightly lifting the masking material 5, that is, the masking sheet 6 falls down without the intervention of further measures or work.

What is claimed is:

1. A masking tape comprising:
   a) a heat resistant adhesive tape comprising a flexible sheet backing and a pressure-sensitive adhesive layer applied to said backing.
   b) a masking material, which is laminated in an edge region of the pressure-sensitive adhesive layer, said masking material being capable of adhering to paint and of absorbing paint, and
   c) a masking sheet, which is laminated onto said edge region of the pressure-sensitive adhesive layer, the masking sheet covering the masking material on a side thereof.

2. The masking tape of claim 1, wherein the adhesive tape is a heat-resistant adhesive tape for the automobile painter with a heat resistance at temperatures up to 130° C. (1hr).

3. The masking tape of claim 1, wherein the adhesive tape is 15 to 75 mm wide.

4. The masking tape of claim 1, wherein the masking material is selected from the group consisting of paper, woven fabric, nonwoven fabric and another sheet material capable of adhering.

5. The masking tape of claim 1, wherein the masking material is unbleached Kraft paper, having a weight of 30 to 40 g/m² and a width of 15 to 50 cm.

6. The masking tape of claim 1, wherein the masking sheet is a polyolefin sheet which has a thickness of 7 to 40 mm and a width of 0.5 to 2 m.

7. The masking tape of claim 1, wherein the masking sheet is folded so that it can be extended along me external surface of the masking material and is folded against the masking material in accordion fashion.

8. The masking tape of claim 1, wherein a portion of the edge region of the pressure-sensitive adhesive layer to which the masking material adheres is 1 to 5 mm wide and the portion of the edge region of the pressure-sensitive adhesive layer to which the masking sheet adheres is 1 to 5 mm wide.

9. The masking tape of claim 1, wherein the tape is rolled up into a roll, the masking sheet being folded and the height of the roll corresponding approximately to the width of the masking material plus the width of the adhesive tape.

10. A method comprising applying the masking tape of claim 1 to a part to be masked, and then subjecting said part to a surface treatment.

11. The masking tape of claim 2, wherein the heat-resistant adhesive tape is a fine line tape.

12. The masking tape of claim 1, wherein the flexible sheet backing is of polypropylene or soft PVC.

13. The masking tape of claim 3, wherein the adhesive tape is 19 to 30 mm wide.

14. The masking tape of claim 5, wherein the width is 20 to 40 cm.

15. The masking tape of claim 6, wherein the thickness is 8 to 20 mm.

16. The masking tape of claim 6, wherein the masking sheet is a polyethylene sheet.

17. The masking tape of claim 6, wherein the masking sheet is corona pretreated.

18. The masking tape of claim 1, wherein a portion of the edge region of the pressure-sensitive adhesive layer to which the masking material adheres is 2 to 4 mm wide and the portion of the edge region of the pressure-sensitive adhesive composition to which the masking sheet adheres is 2 to 4 mm wide.

19. The method of claim 10, wherein the part is an automobile part.

20. The method of claim 10, wherein the surface treatment is a painting treatment.

* * * * *